United States Patent
Lin et al.

(10) Patent No.: US 12,521,975 B2
(45) Date of Patent: Jan. 13, 2026

(54) PRINTER WITH LAMINATING FUNCTION

(71) Applicant: KINPO ELECTRONICS, INC., New Taipei (TW)

(72) Inventors: Chien-Yu Lin, New Taipei (TW); Wei-Chun Jau, New Taipei (TW); Tsung-Hua Kuo, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 129 days.

(21) Appl. No.: 18/408,079

(22) Filed: Jan. 9, 2024

(65) Prior Publication Data
US 2025/0128506 A1    Apr. 24, 2025

(30) Foreign Application Priority Data
Oct. 24, 2023   (CN) .......................... 202311382986.9

(51) Int. Cl.
*B32B 37/00*    (2006.01)
*B32B 37/06*    (2006.01)
(Continued)

(52) U.S. Cl.
CPC .......... *B32B 37/0053* (2013.01); *B32B 37/06* (2013.01); *B32B 37/10* (2013.01);
(Continued)

(58) Field of Classification Search
CPC ........ B32B 2037/0069; B32B 37/0053; B32B 37/06; B32B 37/10; B32B 41/00; G03G 15/6582; B41J 11/0015
See application file for complete search history.

(56) References Cited

U.S. PATENT DOCUMENTS 3,660,201 A * 5/1972 Senior ................... B44C 5/0469
156/64
5,019,203 A * 5/1991 Singer ................... B32B 37/226
156/499
(Continued)

FOREIGN PATENT DOCUMENTS

DE    4024922 A1 * 2/1991 ........... B32B 37/226
EP    0547524 A1 * 6/1993 ......... B32B 37/0046
(Continued)

OTHER PUBLICATIONS

Translation of GB2082502.*
(Continued)

*Primary Examiner* — Sonya M Sengupta
(74) *Attorney, Agent, or Firm* — HDLS IPR SERVICES; Chun-Ming Shih

(57) ABSTRACT

A printer with a laminating function, which is applied with a laminating plastic film, includes: a printer body having a printing passageway, a paper feeding port communicating with the printing passageway, and a paper feeding tray and a paper feeding wheel set; the laminating plastic film is conveyed to the printing passageway by passing the paper feeding tray and the paper feeding port; a pressurizing and heating module disposed in the printing passageway to heat and laminate the laminating plastic film; a plastic film sensor generating a plastic film signal when sensing the laminating plastic film; a process unit electrically connected to the pressurizing and heating module and the plastic film sensor; the process unit controls a heating temperature and a laminating pressure of the pressurizing and heating module after receiving the plastic film signal.

8 Claims, 4 Drawing Sheets

(51) Int. Cl.
*B32B 37/10* (2006.01)
*B32B 41/00* (2006.01)
*B41J 11/00* (2006.01)
*G03G 15/00* (2006.01)

(52) U.S. Cl.
CPC ........... *B32B 41/00* (2013.01); *B41J 11/0015* (2013.01); *G03G 15/6582* (2013.01); *B32B 2037/0069* (2013.01)

(56) References Cited

U.S. PATENT DOCUMENTS

| 2024/0217227 | A1* | 7/2024 | Sohn | ........................ | B32B 7/06 |
| 2025/0128506 | A1* | 4/2025 | Lin | ........................ | B32B 37/06 |

FOREIGN PATENT DOCUMENTS

| JP | H1016351 A | 1/1998 |
| JP | 2018180400 A | 11/2018 |
| JP | 2019147661 A | 9/2019 |

OTHER PUBLICATIONS

Translation of EP 0547524.*
Translation of DE4024922.*
Translation of description of DE4024922.*
Office Action dated Dec. 3, 2024 of the corresponding Japan patent application No. 2023-202948.

* cited by examiner

PRINTER WITH LAMINATING FUNCTION

BACKGROUND OF THE DISCLOSURE

1. Technical Field

The technical field relates to a printer structure, especially to a printer with a laminating function.

2. Description of Related Art

In a workplace, a related-art laminating device is additionally provided to perform a laminating operation when a document or a photo is desired to be laminated. The working manner of the laminating device is to make the laminating plastic film be heated and adhered, and a top roller and a bottom roller are used to apply a pressure to make the laminating plastic film be pressed and laminated.

However, the frequency of requiring the laminating device is low, the consumer may not have a high willingness to buy the laminating device and the laminating device occupies an additional space. Moreover, a laser printer has a heating component and a pressurizing roller to make carbon powders be melted and fixed on a piece of paper. As such, how to make the laser printer to be provided with a laminating function to save the requirement of buying the laminating device is the problem to be improved by the skilled people in the art.

Accordingly, the applicant of the present disclosure has devoted himself for improving the mentioned shortages.

SUMMARY OF THE DISCLOSURE

The disclosure is directed to a printer with a laminating function, in which a heating temperature and a laminating pressure of a heating and pressurizing module are controlled by a process unit after receiving a plastic film signal to make the printer be provided with an advantage of facilitating a laminating operation.

One of the exemplary embodiments, a printer with a laminating function is applied with a laminating plastic film. The printer includes: a printer body having a printing passageway, a paper feeding port communicating with the printing passageway, and a paper feeding tray and a paper feeding wheel set disposed corresponding to the paper feeding port, the laminating plastic film is conveyed to the printing passageway by sequentially passing the paper feeding tray and the paper feeding port via the paper feeding wheel set; a pressurizing and heating module disposed in the printing passageway to heat and laminate the laminating plastic film; a plastic film sensor disposed on the printer body and arranged corresponding to at least one of the paper feeding port and the paper feeding tray, and the plastic film sensor generates a plastic film signal when sensing the laminating plastic film; a process unit electrically connected to the pressurizing and heating module and the plastic film sensor, the process unit controls a heating temperature and a laminating pressure of the pressurizing and heating module after receiving the plastic film signal.

Accordingly, the pressurizing and heating module of the printer is mainly used to make carbon powders be melted and fixed on the paper, the set temperature and the set pressure of the pressurizing and heating module generally are not suitable for adhering the laminating plastic film. Through the plastic film senor generating the plastic film signal after sensing the laminating plastic film and the process unit receiving the plastic film signal, the pressurizing and heating module is controlled to be heated to a plastic film adhering temperature and pressurized to a plastic film laminating pressure. As such, the printer is provided with advantages of pre-setting laminating parameters and making the lamination operation be easily performed.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

Figure 1:
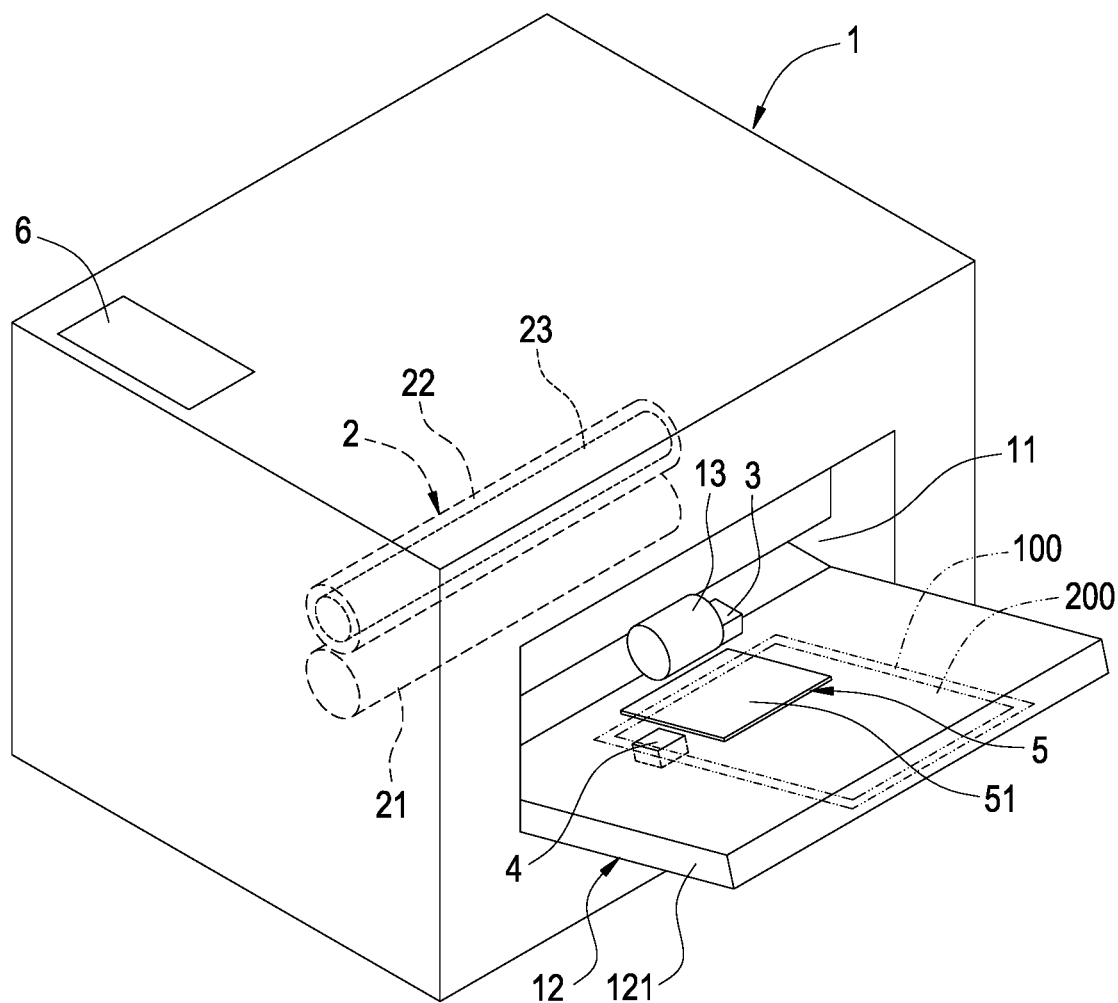
FIG. 1 is a schematic view showing an operating status of the printer according to the disclosure.

The technical contents of this disclosure will become apparent with the detailed description of embodiments accompanied with the illustration of related drawings as follows. It is intended that the embodiments and drawings disclosed herein are to be considered illustrative rather than restrictive.

Please refer from FIG. 1 to FIG. 5, the disclosure is directed to a printer with a laminating function. The printer 10 mainly includes a printer body 1, a pressurizing and heating module 2, a plastic film sensor 3 and a process unit 6.

The printer 10 is applied with a laminating plastic film 100 and a piece of paper 200. The laminating plastic film 100 is folded and stacked in a top-down manner, with one end connected and the other end separated. The paper 200 is placed within the laminating plastic film 100 that has been folded and stacked from top to bottom, and the paper 200 is laminated by the laminating plastic film 100 that has been folded and stacked from top to bottom. The laminating plastic film 100 is composed of a polyethylene terephthalate (PET) film with an ethylene vinyl acetate (EVA) adhesive coated on its inner surface.

Figure 2:
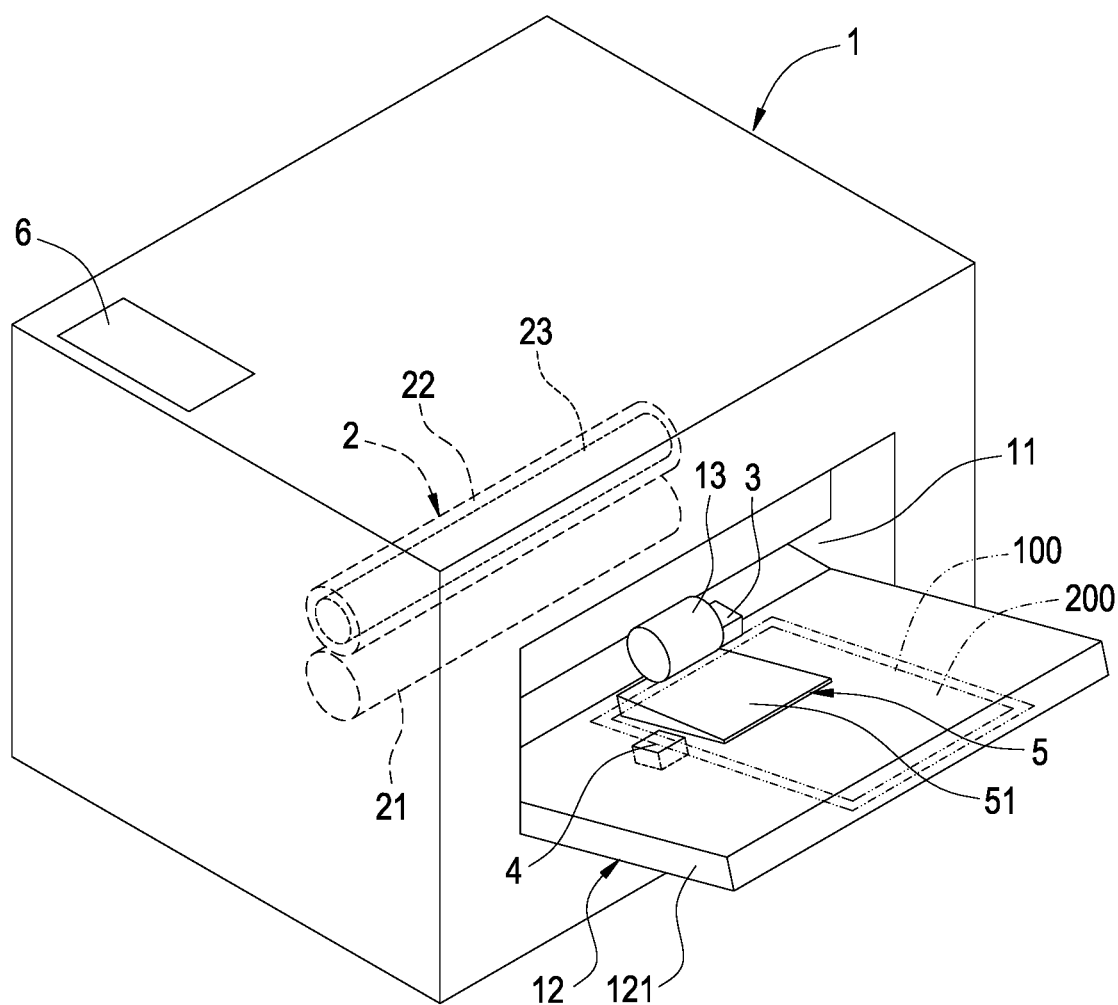
FIG. 2 is a schematic view showing another operating status of the printer according to the disclosure.
Figure 3:
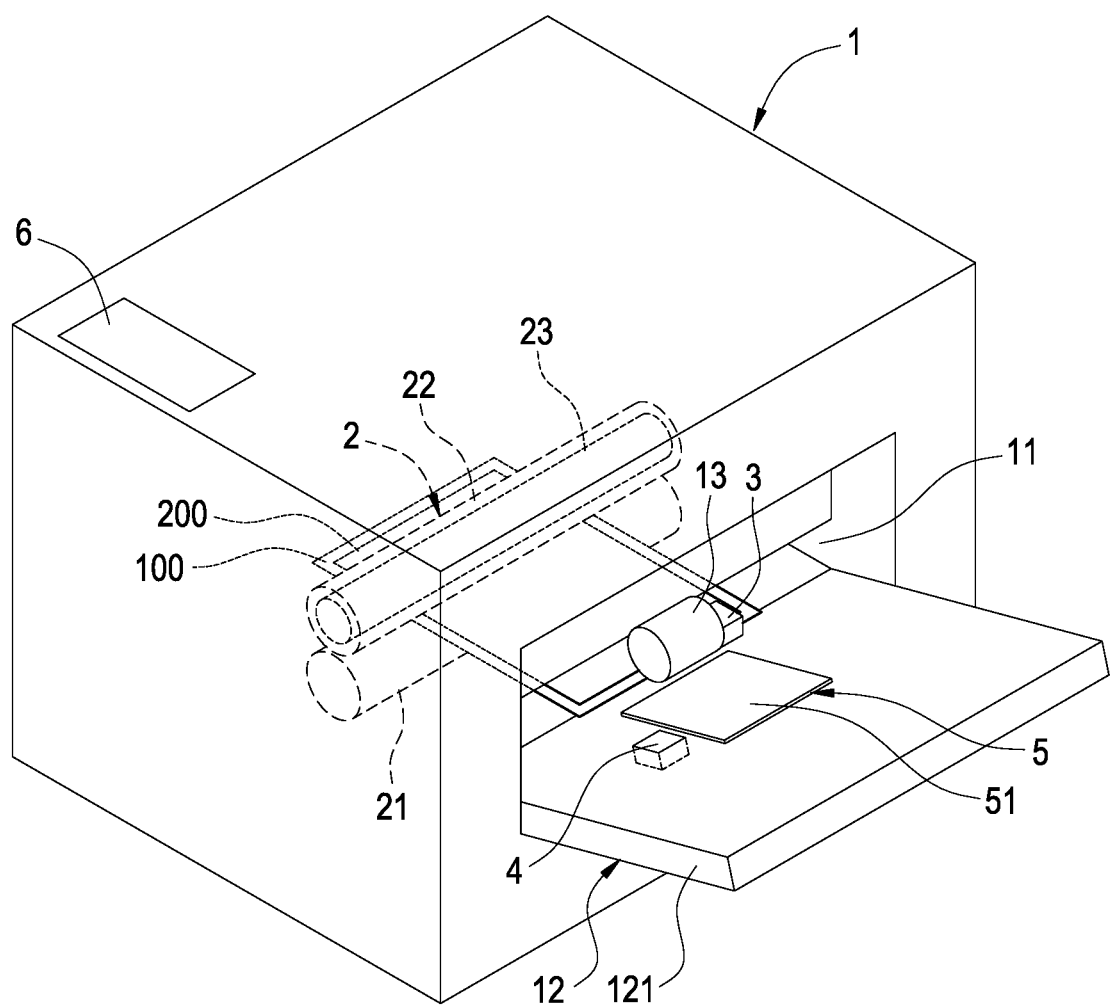
FIG. 3 is a schematic view showing one another operating status of the printer according to the disclosure.
Figure 4:
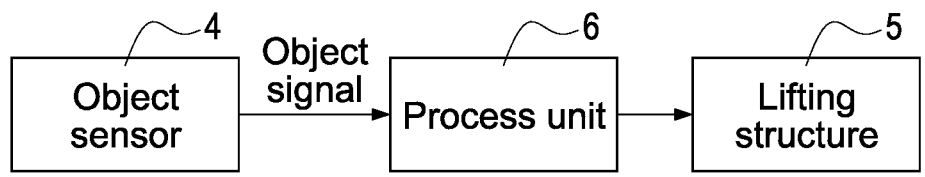
FIG. 4 is a block diagram showing the printer according to the disclosure.
Figure 5:
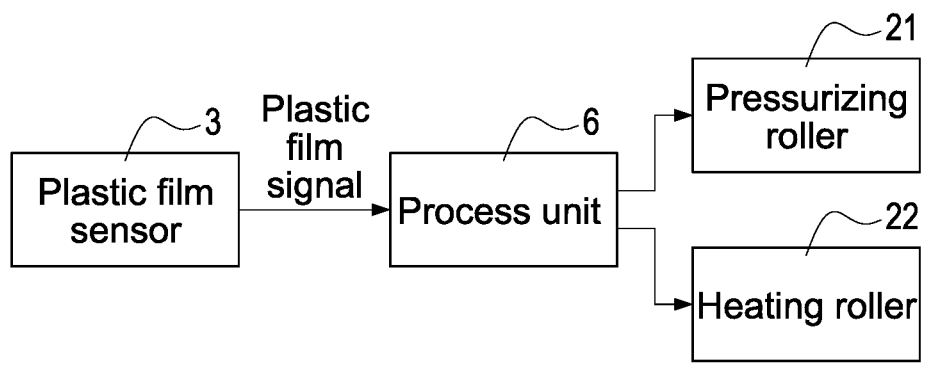
FIG. 5 is another block diagram showing the printer according to the disclosure.

Please refer from FIG. 1 to FIG. 3, the printer body 1 has a printing passageway (not shown in figures), a paper feeding port 11 communicating with the printing passageway (not shown in figures), and a paper feeding tray 12 disposed corresponding to the paper feeding port 11 and a paper feeding wheel set 13. The laminating plastic film 100 is sequentially conveyed from the paper feeding tray 12 through the paper feeding port 11 to the printing passageway (not shown in the figures) by the paper feeding wheel set 13. In an example embodiment, the paper feeding tray 12 is an external paper feeding tray 121, here is not intended to be limiting.

As shown from FIG. 1 to FIG. 3, in an example embodiment, the printer 10 is a laser printer. The laser printer has a printing module (not shown in figures) allowing carbon powders to be attached on the paper and a fuser allowing the carbon powders to be melted and fixed on the paper. In an example embodiment, the fuser is the pressurizing and heating module 2. The printing module (not shown in figures) and the pressurizing and heating module 2 are disposed in the printing passageway (not shown in figures). The printing module (not shown in figures) is disposed between the paper feeding tray 12 and the pressurizing and heating module 2, thus the laminating plastic film 100 is guided by the paper feeding wheel set 13 and the printing passageway (not shown in figures) to firstly pass the printing module (not shown in figures) and then pass the pressurizing and heating module 2.

Moreover, the pressurizing and heating module 2 includes a pressurizing roller 21 and a heating roller 22, which jointly clamp the laminating plastic film 100. The pressurizing roller 21 is provided with an adjustable pressure abutting against the heating roller 22. The heating roller 22 has a heater 23. A temperature of the heating roller 22 is adjusted by the heater 23, thus the pressurizing and heating module 2 is used to heat and press the laminating plastic film 100.

In an example embodiment, the heating roller 22 has the heater 23. The pressurizing roller 21 does not has a heater. The pressurizing and heating module 2 composed of the pressurizing roller 21 and the heating roller 22 is the fuser, here is not intended to be limiting. In an example embodiment, the pressurizing and heating module 2 is not the fuser, the pressurizing roller 21 has a heater to make a temperature of the pressurizing roller 21 be adjusted by the heater.

Please refer to FIG. 1, FIG. 2, FIG. 3 and FIG. 5, the plastic film sensor 3 is disposed on the printer body 1 and arranged corresponding to at least one of the paper feeding port 11 and the paper feeding tray 12. The plastic film sensor 3 generates a plastic film signal when sensing the laminating plastic film 100.

Details are provided as follows. In an example embodiment, the plastic film sensor 3 is disposed at one side of the paper feeding wheel set 13. The plastic film sensor 3 is disposed corresponding to the paper feeding port 11 or one end of the paper feeding tray 12 close to the paper feeding port 11. When the paper 200 is disposed in the laminating plastic film 100 to be processed with a laminating operation, the paper 200 is placed at a location close to the center of the laminating plastic film 100 to make an edge of the laminating plastic film 100 be reserved for being fully adhered to finish the laminating operation. With a huge difference between a light reflecting rate of the paper 200 and a light reflecting rate of the laminating plastic film 100 (which is more light transparent to make a laminated object be seen), the edge of the laminating plastic film 100 which is not laminated with the paper 200 is easily sensed by the plastic film sensor 3, thus the plastic film sensor 3 precisely determines the material of the laminating plastic film 100 when sensing the edge of the laminating plastic film 100. As such, the sensing accuracy of the plastic film sensor 3 is enhanced.

Please refer from FIG. 1 to FIG. 5, the process unit 6 is disposed at an upper portion of the printer body 1 and electrically connected to the paper feeding wheel set 13, the pressurizing and heating module 2, the plastic film sensor 3 and a display screen (not shown in figures) of the printer body 1. After the process unit 6 receives the plastic film signal, the process unit 6 controls a heating temperature and a laminating pressure of the pressurizing and heating module 2. Details are provided as follows. After the process unit 6 receives the plastic film signal, the heating roller 22 is heated to a plastic film adhering temperature allowing the adhesive on the laminating plastic film 100 to be heated and melted, and the pressurizing roller 21 provides a plastic film laminating pressure to the heating roller 22 to make the adhesive on the laminating plastic film 100 be pressed and adhered.

Please refer from FIG. 1 to FIG. 4, the printer 10 further includes an object sensor 4. The object sensor 4 is disposed on a top surface of the paper feeding tray 12. The object sensor 4 generates an object signal when an object, for example the laminating plastic film 100 or the paper 200, is placed on the paper feeding tray 12.

Moreover, the plastic film sensor 3 and the object sensor 4 are a photoelectric sensor composed of an infrared emitting tube and an infrared receiving tube. Through a light strength variation between an emitting end and a receiving end being converted into a current variation, an objective of detecting material is achieved. In other words, through different light absorbing and reflecting rates of the objects made of different materials, a received current signal is different to make the material of the sensed object be determined.

Please refer from FIG. 1 to FIG. 4, the printer 10 further includes a lifting structure 5. The lifting structure 5 is used to make sure the paper 20 disposed in the laminating plastic film 100 and the laminating plastic film 100 being smoothly and precisely conveyed to the paper feeding port 11 for the laminating operation. The lifting structure 5 is disposed on the paper feeding tray 12. The process unit 6 is electrically connected to the object sensor 4 and the lifting structure 5. After the process unit 6 receives the object signal, the lifting structure 5 is controlled to lift the laminating plastic film 100 to make the laminating plastic film 100 be guided into the paper feeding port 11.

According to an example embodiment, the lifting structure 5 is a liftable inclined plate 51 disposed on the top surface of the paper feeding tray 12. The liftable inclined plate 51 is lifted to make the laminating plastic film 100 be pushed into the paper feeding port 11, here is not intended to be limiting. The lifting structure 5 is disposed at a bottom end of the paper feeding tray 12. The lifting structure 5 lifts one end of the paper feeding tray 12 away from the paper feeding port 11, thus an elevation angle of the paper feeding tray 12 is more inclined to make the top surface of the paper feeding tray 12 be in an inclined status, and the laminating plastic film 100 is pushed into the paper feeding port 11.

Please refer from FIG. 2 to FIG. 5, which illustrate the operating status of the printer 10. When the laminating plastic film 100 is placed in the paper feeding tray 12, the object sensor 4 generates the object signal because the object sensor 4 senses the laminating plastic film 100. The process unit 6 receives the object signal and then controls the lifting structure 5 to lift the laminating plastic film 100 to make the laminating plastic film 100 be guided into the paper feeding port 11.

The plastic film sensor 3 generates the plastic film signal after sensing the laminating plastic film 100. The process unit 6 receives the plastic film signal and then controls the heating roller 22 to be heated to the plastic film adhering temperature to make the adhesive on the laminating plastic film 100 be heated and melted, and the pressurizing roller 21 provides the plastic film laminating pressure to the heating roller 22 to make the adhesive on the laminating plastic film 100 be pressed and laminated. In other words, the pressurizing and heating module 2 is controlled to be heated to the plastic film adhering temperature and pressurized to the plastic film laminating pressure.

When a print starting button of the displace screen of the printer body 1 is pressed, the process unit 6 controls the paper feeding wheel set 13 to make the laminating plastic film 100 be conveyed to the printing passageway (not shown in figures), at this moment the pressurizing and heating module 2 is pre-heated to a temperature allowing the laminating plastic film 100 to be stably heated and adhered. Thus, a problem of the heating temperature being overly lower to make the laminating plastic film be fogged is avoided, and another problem of the heating temperature being overly high to make the laminating plastic film generate bubbles is avoided. The pressurizing and heating module 2 applies a proper pressure to the laminating plastic film 100 to make the laminating plastic film 100 be tightly pressed. As such, the operation of adhering the laminating plastic film 100 to laminate the paper 200 is finished.

Accordingly, the pressurizing and heating module 2 of the printer 10 is mainly used to make the carbon powders be melted and fixed on the paper, the set temperature and the set pressure of the pressurizing and heating module 2 generally are not suitable for adhering the laminating plastic film 100. Through the plastic film senor 3 generating the plastic film signal after sensing the laminating plastic film 100 and the process unit 6 receiving the plastic film signal, the pressurizing and heating module 2 is controlled to be heated to the plastic film adhering temperature and pressurized to the plastic film laminating pressure. Accordingly, the printer 10 is provided with advantages of pre-setting laminating parameters and making the lamination operation be easily performed.

While this disclosure has been described by means of specific embodiments, numerous modifications and variations could be made thereto by those skilled in the art without departing from the scope and spirit of this disclosure set forth in the claims.

What is claimed is:

1. A printer with a laminating function, applied with a laminating plastic film and a piece of paper, wherein the paper is placed within the laminating plastic film that is folded and stacked from top to bottom, and the printer comprising:

a printer body, comprising a printing passageway, a paper feeding port communicating with the printing passageway, and a paper feeding tray and a paper feeding wheel set disposed corresponding to the paper feeding port, wherein the laminating plastic film and the piece of paper are conveyed sequentially by the paper feeding tray and the paper feeding port to the printing passageway through the paper feeding wheel set;

a pressurizing and heating module, disposed in the printing passageway to heat and press the laminating plastic film;

a plastic film sensor, disposed in the printer body and arranged corresponding to at least one of the paper feeding port and the paper feeding tray, wherein the plastic film sensor is configured to generate a plastic film signal when sensing the laminating plastic film; and a process unit, electrically connected to the pressurizing and heating module and the plastic film sensor, wherein the process unit is configured to control a heating temperature and a laminating pressure of the pressurizing and heating module after receiving the plastic film signal;

wherein the printer is a laser printer having a printing module allowing carbon powders to be attached on the paper, and a fuser which is a pressurizing and heating module allowing the carbon powders to be melted and fixed on the paper; the printing module and the pressurizing and heating module are disposed in the printing passageway, and the printing module is disposed between the paper feeding tray and the pressurizing and heating module, thus the laminating plastic film is guided by the paper feeding wheel set and the printing passageway to firstly pass the printing module and then pass the pressurizing and heating module; the heating temperature makes the laminating plastic film be heated and adhered, and the laminating pressure make the laminating plastic film be pressed and laminated with the paper.

2. The printer according to claim 1, wherein the pressurizing and heating module comprises a pressurizing roller and a heating roller jointly clamping the laminating plastic film, and when the process unit receives the plastic film signal, the heating roller is heated to a plastic film adhering temperature and the pressurizing roller provides a plastic film laminating pressure to the heating roller.

3. The printer according to claim 1, wherein the plastic film sensor is disposed at one side of the paper feeding wheel set corresponding to the paper feeding port.

4. The printer according to claim 1, wherein the plastic film sensor is disposed at one side of the paper feeding wheel set corresponding to one end of the paper feeding tray close to the paper feeding port.

5. The printer according to claim 1, further comprising an object sensor disposed on a top surface of the paper feeding tray, wherein the object sensor is configured to generate an object signal when sensing the laminating plastic film being placed on the paper feeding tray.

6. The printer according to claim 5, further comprising a lifting structure disposed on the paper feeding tray, wherein the process unit is electrically connected to the object sensor and the lifting structure, when the process unit receives the object signal, the lifting structure is configured to lift the laminating plastic film to guide the laminating plastic film to enter the paper feeding port.

7. The printer according to claim 6, wherein the lifting structure is a liftable inclined plate disposed on the top surface of the paper feeding tray.

8. The printer with the laminating function according to claim 1, wherein the paper feeding tray is an external paper feeding tray.

* * * * *